US010282218B2

(12) United States Patent
Li et al.

(10) Patent No.: US 10,282,218 B2
(45) Date of Patent: May 7, 2019

(54) NONDETERMINISTIC TASK INITIATION BY A PERSONAL ASSISTANT MODULE

(71) Applicant: Google Inc., Mountain View, CA (US)

(72) Inventors: Cheng Li, San Jose, CA (US); Bo Wang, San Jose, CA (US); Okan Kolak, Sunnyvale, CA (US); Peter Hodgson, London (GB); Deniz Binay, Mountain View, CA (US); Dhruv Amin, San Francisco, CA (US); Pravir Gupta, Mountain View, CA (US); Nitin Shetti, Sunnyvale, CA (US); Javier Rey, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 178 days.

(21) Appl. No.: 15/175,639

(22) Filed: Jun. 7, 2016

(65) Prior Publication Data
US 2017/0351532 A1 Dec. 7, 2017

(51) Int. Cl.
 *G06F 9/48* (2006.01)
 *G06F 9/451* (2018.01)
 *G10L 15/22* (2006.01)

(52) U.S. Cl.
 CPC ............ *G06F 9/453* (2018.02); *G06F 9/4843* (2013.01); *G10L 15/22* (2013.01)

(58) Field of Classification Search
 CPC ....... G06F 9/4446; G06F 9/4843; G06F 9/453
 See application file for complete search history.

(56) References Cited

U.S. PATENT DOCUMENTS

| 8,706,503 | B2 | 4/2014 | Cheyer et al. |
| 9,633,674 | B2* | 4/2017 | Sinha ...................... G10L 25/00 |
| 2007/0136264 | A1 | 6/2007 | Tran |
| 2009/0150156 | A1 | 6/2009 | Kennewick et al. |
| 2012/0265528 | A1* | 10/2012 | Gruber .................... G10L 15/18 704/235 |
| 2014/0032678 | A1 | 1/2014 | Koukoumidis et al. |

(Continued)

FOREIGN PATENT DOCUMENTS

| EP | 1914639 | 4/2008 |
| EP | 2575128 | 4/2013 |
| WO | 2012135226 | 10/2012 |

OTHER PUBLICATIONS

International Search Report and Written Opinion of PCT Ser. No. PCT/US16/68909 dated Mar. 20, 2017.

(Continued)

*Primary Examiner* — Jennifer N To
*Assistant Examiner* — Reji Kartholy
(74) *Attorney, Agent, or Firm* — Middleton Reutlinger

(57) ABSTRACT

Techniques are described herein for leveraging information about a user to enable a personal assistant module to make various inferences about what actions that may be responsive to a user declaration. In various implementations, upon identifying a user declaration received at a computing device, a plurality of candidate responsive actions that can be initiated by the computing device in response to the user declaration may be identified. A single candidate responsive action may then be non-deterministically (e.g., randomly, stochastically) selected to be exclusively initiated on the computing device in response to the user declaration.

20 Claims, 4 Drawing Sheets

(56) References Cited

U.S. PATENT DOCUMENTS

| | | | | |
|---|---|---|---|---|
| 2014/0095172 A1* | 4/2014 | Cabaco | ................... | G10L 21/06 |
| | | | | 704/275 |
| 2015/0279360 A1 | 10/2015 | Mengibar et al. | | |
| 2016/0055849 A1* | 2/2016 | Watanabe | ............... | G10L 15/00 |
| | | | | 704/235 |
| 2017/0018268 A1* | 1/2017 | Quast | ................... | G10L 15/063 |

OTHER PUBLICATIONS

The Intellectual Property Office of the United Kingdom; Combined Search Report under Section 17 and Abbreviated Examination Report under Section 18(3) of Application No. GB1621097.3 dated May 17, 2017.

European Patent Office; Written Opinion of the International Preliminary Examining Authority of International Application No. PCT/US2016/068909; 6 pages; dated Apr. 19, 2018.

European Patent Office; International Preliminary Report on Patentability of International Application No. PCT/US2016/068909; 15 pages; dated Sep. 5, 2018.

* cited by examiner

NONDETERMINISTIC TASK INITIATION BY A PERSONAL ASSISTANT MODULE

BACKGROUND

Personal assistant modules are software processes installed on computing devices such as smart phones, tablets, vehicle navigation systems, and smart watches to provide user-friendly interfaces for users to issue natural language commands. Users often issue natural language commands using their voices, but personal assistant modules may respond to other modalities as well, such as various forms of textual input. Existing personal assistant modules may lack sufficient intelligence to recall a user's previous declarations and/or preferences. Consequently, if a user issues an ambiguous declaration (e.g., request, statement, command) that can be potentially responded to in multiple ways, the personal assistant module may need to solicit additional information from the user to determine how to proceed. Suppose a user speaks the words "call Bob" into her phone, but there are multiple contacts in the user's phonebook that match the name "Bob." A personal assistant module operating on the user's phone may ask which Bob the user meant and/or whether to dial Bob's home or work phone. Or, suppose another user speaks the words "remind me to pick up groceries tomorrow" into his smart watch. A personal assistant module operating on the user's smart watch—or on a smart phone in communication with the smart watch—may ask which application (e.g., calendar, task list, social networking application) the user wishes to use to set the reminder.

SUMMARY

This specification is directed generally to various techniques for leveraging information about a user that is accessible to a personal assistant module to enable the personal assistant module to make various inferences about what a user seeks or would be potentially interested in. These techniques may, for instance, reduce the need by a personal assistant module to solicit additional information from the user to identify which responsive action to take, or which parameters should be provided as inputs for a responsive action.

In some implementations, a personal assistant module may be provided with access to a history of interaction between a user and one or more computing devices that collectively form a coordinated "ecosystem" of computing devices operated by the user (e.g., her phone, tablet, smart watch, automobile navigation system, etc.). When a user issues a declaration, the personal assistant module may initiate a non-deterministic task initiation process that identifies a plurality of candidate responsive actions that potentially will be responsive to the user's declaration. For example, if the user issues a declaration, the personal assistant module may initiate a non-deterministic task initiation process that identifies a plurality of candidate responsive actions that potentially will be responsive to the user declaration. In some implementations, based on the interaction history and/or other information signals such as the user's past/present contexts, the personal assistant module may determine probabilities that the plurality of candidate responsive actions will be responsive to the user declaration. In various implementations, a "declaration" may refer to a user request for responsive action, or simply to a statement issued by the user to which one or more actions may be potentially responsive. For example, a user could simply state, "I'm hungry," and candidate responsive actions may include initiation of one or more applications related to restaurants, such as restaurant review apps, reservation apps, and so forth.

A single one of the plurality of candidate responsive actions may then be non-deterministically (e.g., stochastically) selected (e.g., with at least some element of chance) based at least on the probabilities. For instance, if candidate A has a 51% chance of being responsive to the user declaration, and candidate B has a 49% chance of being responsive to the user declaration, then candidate A likely will be selected approximately 51% of the time and candidate B likely will be selected approximately 49% of the time. By only selecting a single responsive action, the user is not inundated with multiple responsive actions. Instead, the user is presented with a single choice, which the user can accept or reject. The user's acceptance or rejection of the single non-deterministically-selected responsive may be strong feedback for a probability determined for that responsive action (or sufficiently similar responsive actions) in the future.

Therefore, in some implementations, a method may include: identifying, by one or more processors, a user declaration received at a computing device; identifying, by one or more of the processors, based on the user declaration, a plurality of candidate responsive actions that can be initiated by the computing device in response to the user declaration; non-deterministically selecting, by one or more of the processors, a single candidate responsive action of the plurality of candidate responsive actions to be exclusively initiated on the computing device in response to the user declaration; and exclusively initiating, by one or more of the processors, the single candidate responsive action on the computing device.

In various implementations, the method may further include determining, by one or more of the processors, based on a history of interaction between the user and one or more computing devices operated by the user, a probability that initiation of each candidate responsive action will be responsive to the user declaration. In various implementations, the non-deterministically selecting may be based at least in part on the probabilities of the plurality of candidate responsive actions.

In various implementations, the method may further include altering, by one or more of the processors, a probability associated with the initiated responsive action based on one or more interactions between the user and the computing device following initiation of the selected action. In various implementations, the one or more interactions between the user and the computing device may include rejection of the selected responsive action and manual initiation of an alternative candidate responsive action. In various implementations, the altering may include altering the probability associated with the selected responsive action by an amount that is inversely proportionate to a measure of similarity between the selected responsive action and the alternative candidate responsive action.

In various implementations, the probabilities may be further based at least in part on a current context of the user. In various implementations, the current context of the user may a current location of the user determined by the computing device, and/or a current time at a current location of the user. In various implementations, a probability associated with at least one candidate responsive action may be based on a measure of similarity between the user's current context and a context of the user when the user initiated the at least one responsive action in the past.

In various implementations, the plurality of candidate responsive actions may include a plurality of software applications installed on the computing device. In various implementations, the user declaration may include a request to initiate a telephone call, and the plurality of candidate responsive actions include a plurality of telephone applications installed on the computing device. In various implementations, the user declaration may include a request to send a message, and the plurality of candidate responsive actions include a plurality of messaging applications installed on the computing device. In various implementations, the user declaration may include a request to set a reminder, and the plurality of candidate responsive actions may include a plurality of applications installed on the computing device that include reminder functionality. In various implementations, the user declaration may include a request to initiate communication with a name, and the plurality of candidate responsive actions include a plurality of contacts of the user that include the name.

In addition, some implementations include an apparatus including memory and one or more processors operable to execute instructions stored in the memory, where the instructions are configured to perform any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In the implementations discussed hereinafter, a personal assistant module (also referred to as an "intelligent personal assistant" or "mobile assistant") may be provided with access to a history of interaction between a user and one or more computing devices in an ecosystem of devices operated by the user (e.g., her phone, tablet, smart watch, automobile navigation system, etc.). When a user issues a declaration (typically but not necessarily using speech), the personal assistant module may initiate a non-deterministic task initiation process that identifies a plurality of candidate responsive actions that may be responsive to the user's declaration. Based on the interaction history, in some implementations, the mobile assistant may determine probabilities that the plurality of candidate responsive actions would be responsive to the user's declaration.

A single one of the plurality of candidate responsive actions may then be non-deterministically selected (e.g., stochastically, with at least some element of chance), in some cases based at least in part on the probabilities. For instance, if candidate action A has a 51% chance of being responsive to the user declaration, and candidate responsive action B has a 49% chance of being responsive to the user declaration, then candidate responsive action A likely will be selected close to 51% of the time and candidate responsive action B likely will be selected close to 49% of the time. In other implementations, only those candidates having probabilities that satisfy one or more thresholds may be preliminarily selected, and then a responsive action may be non-deterministically (e.g., completely random or randomly based on probabilities) selected from the remaining candidates. By only selecting a single responsive action, the user is not inundated with multiple responsive actions. Instead, the user is presented with a single choice, which the user can accept or reject.

Based on user interaction with the computing device following initiation of the non-deterministically selected responsive action, a probability associated with the selected responsive action may be altered. For example, if the responsive action was to open up an Internet calling application and pre-dial a particular user's number without actually initiating the call, and the user hits the "talk" button to initiate the call, that may cause the probability associated with that action to be increased. By contrast, if the user rejects the Internet calling application by closing it without completing the call, then the probability associated with that responsive action may be decreased.

Further details regarding selected implementations are discussed hereinafter. It will be appreciated however that other implementations are contemplated so the implementations disclosed herein are not exclusive.

Figure 1:
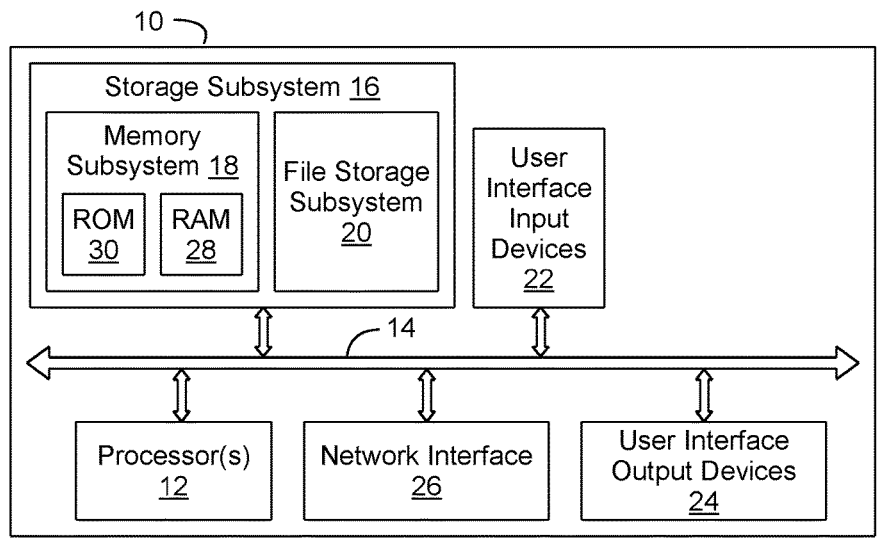
FIG. 1 illustrates an example architecture of a computer system.

Now turning to the drawings, wherein like numbers denote like parts throughout the several views, FIG. 1 is a block diagram of electronic components in an example computer system 10. System 10 typically includes at least one processor 12 that communicates with a number of peripheral devices via bus subsystem 14. These peripheral devices may include a storage subsystem 16, including, for example, a memory subsystem 18 and a file storage subsystem 20, user interface input devices 22, user interface output devices 24, and a network interface subsystem 26. The input and output devices allow user interaction with system 10. Network interface subsystem 26 provides an interface to outside networks and is coupled to corresponding interface devices in other computer systems.

In some implementations, user interface input devices 22 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 10 or onto a communication network.

User interface output devices 24 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 10 to the user or to another machine or computer system.

Storage subsystem 16 stores programming and data constructs that provide the functionality of some or all of the modules described herein. For example, the storage subsystem 16 may include the logic to perform selected aspects of the methods disclosed hereinafter.

These software modules are generally executed by processor 12 alone or in combination with other processors. Memory subsystem 18 used in storage subsystem 16 may include a number of memories including a main random access memory (RAM) 28 for storage of instructions and data during program execution and a read only memory (ROM) 30 in which fixed instructions are stored. A file storage subsystem 20 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 20 in the storage subsystem 16, or in other machines accessible by the processor(s) 12.

Bus subsystem 14 provides a mechanism for allowing the various components and subsystems of system 10 to communicate with each other as intended. Although bus subsystem 14 is shown schematically as a single bus, alternative implementations of the bus subsystem may use multiple busses.

System 10 may be of varying types including a mobile device, a portable electronic device, an embedded device, a desktop computer, a laptop computer, a tablet computer, a wearable device, a workstation, a server, a computing cluster, a blade server, a server farm, or any other data processing system or computing device. In addition, functionality implemented by system 10 may be distributed among multiple systems interconnected with one another over one or more networks, e.g., in a client-server, peer-to-peer, or other networking arrangement. Due to the ever-changing nature of computers and networks, the description of system 10 depicted in FIG. 1 is intended only as a specific example for purposes of illustrating some implementations. Many other configurations of system 10 are possible having more or fewer components than the computer system depicted in FIG. 1.

Implementations discussed hereinafter may include one or more methods implementing various combinations of the functionality disclosed herein. Other implementations may include a non-transitory computer readable storage medium storing instructions executable by a processor to perform a method such as one or more of the methods described herein. Still other implementations may include an apparatus including memory and one or more processors operable to execute instructions, stored in the memory, to perform a method such as one or more of the methods described herein.

Various program code described hereinafter may be identified based upon the application within which it is implemented in a specific implementation. However, it should be appreciated that any particular program nomenclature that follows is used merely for convenience. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that some implementations may not be limited to the specific organization and allocation of program functionality described herein.

Furthermore, it will be appreciated that the various operations described herein that may be performed by any program code, or performed in any routines, workflows, or the like, may be combined, split, reordered, omitted, performed sequentially or in parallel and/or supplemented with other techniques, and therefore, some implementations are not limited to the particular sequences of operations described herein.

Figure 2:
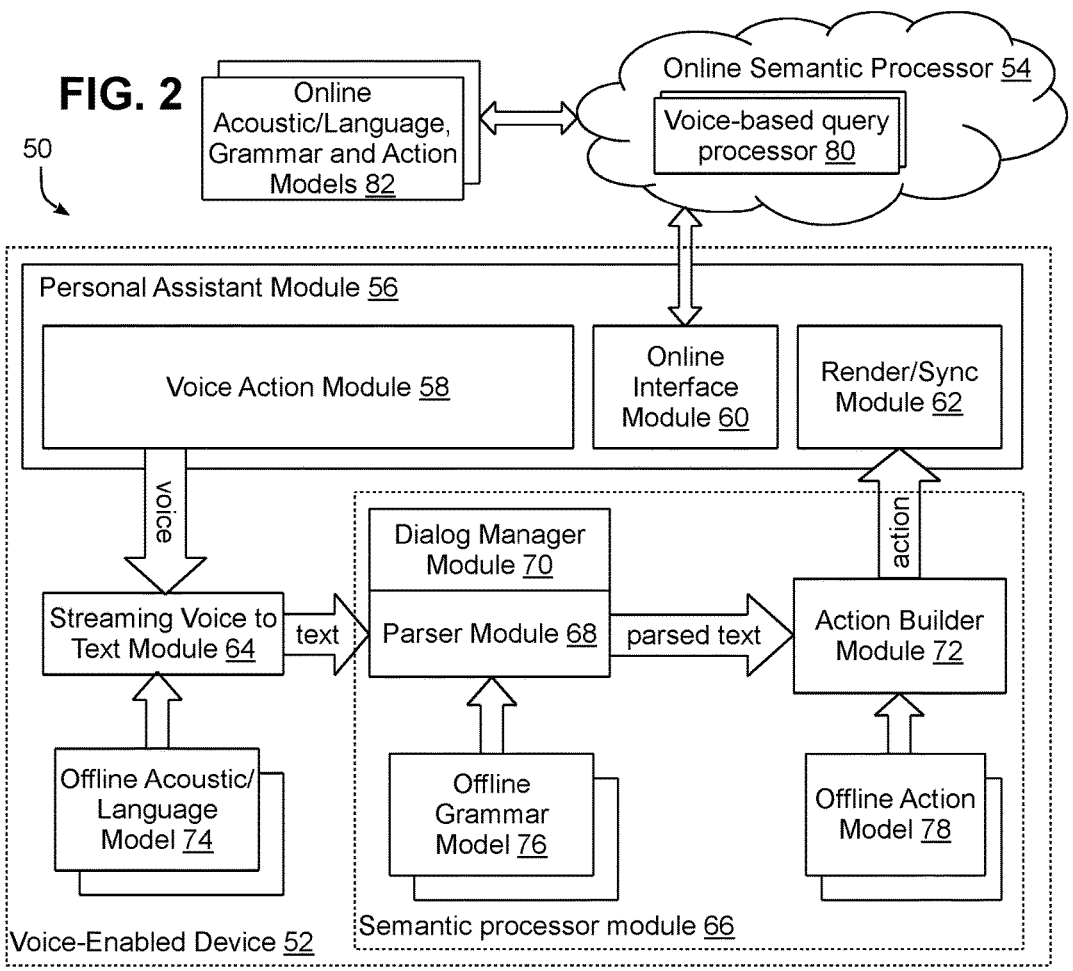
FIG. 2 is a block diagram of an example distributed voice input processing environment.

FIG. 2 illustrates an example distributed voice input processing environment 50, e.g., for use with a voice-enabled device 52 in communication with an online service such as online semantic processor 54. In the implementations discussed hereinafter, for example, voice-enabled device 52 is described as a mobile device such as a cellular phone or tablet computer. Other implementations may utilize a wide variety of other voice-enabled devices, however, so the references hereinafter to mobile devices are merely for the purpose of simplifying the discussion hereinafter. Countless other types of voice-enabled devices may use the herein-described functionality, including, for example, laptop computers, watches, head-mounted devices, virtual or augmented reality devices, other wearable devices, audio/video systems, navigation systems, automotive and other vehicular systems, etc. Moreover, many of such voice-enabled devices may be considered to be resource-constrained in that the memory and/or processing capacities of such devices may be constrained based upon technological, economic or other reasons, particularly when compared with the capacities of online or cloud-based services that can devote virtually unlimited computing resources to individual tasks. Some such devices may also be considered to be offline devices to the extent that such devices may be capable of operating "offline" and unconnected to an online service at least a portion of time, e.g., based upon an expectation that such devices may experience temporary network connectivity outages from time to time under ordinary usage.

Online semantic processor 54 in some implementations may be implemented as a cloud-based service employing a cloud infrastructure, e.g., using a server farm or cluster of high performance computers running software suitable for handling high volumes of declarations from multiple users. Online semantic processor 54 may not be limited to voice-based declarations, and may also be capable of handling other types of declarations, e.g., text-based declarations, image-based declarations, etc. In some implementations, online semantic processor 54 may handle voice-based declarations such as setting alarms or reminders, managing lists, initiating communications with other users via phone, text, email, etc., or performing other actions that may be initiated via voice input. For the purposes of this disclosure, voice-based declarations, declarations, and other forms of voice input may be collectively referred to as voice-based declarations, regardless of whether the voice-based declarations seek to initiate a search, pose a question, issue a command, or even comprise idle chatter, e.g., between a user and a personal assistant module, about the user's personal preferences. In general, therefore, any voice input, e.g., including one or more words or phrases, may be considered to be a voice-based declaration within the context of the illustrated implementations.

In the implementation of FIG. 2, voice input received by voice-enabled device 52 is processed by a voice-enabled application (or "app"), which in FIG. 2 takes the form of a personal assistant module 56. In other implementations, voice input may be handled within an operating system or firmware of voice-enabled device 52. Personal assistant module 56 in the illustrated implementation includes a voice action module 58, online interface module 60 and render/synchronization module 62. Voice action module 58 receives voice input directed to personal assistant module 56 and coordinates the analysis of the voice input and performance of one or more actions for a user of the voice-enabled device 52. Online interface module 60 provides an interface with online semantic processor 54, including forwarding voice input to online semantic processor 54 and receiving responses thereto. Render/synchronization module 62 manages the rendering of a response to a user, e.g., via a visual display, spoken audio, or other feedback interface suitable for a particular voice-enabled device. In addition, in some implementations, module 62 also handles synchronization with online semantic processor 54, e.g., whenever a response or action affects data maintained for the user in the online search service (e.g., where voice input requests creation of an appointment that is maintained in a cloud-based calendar).

Personal assistant module 56 may rely on various middleware, framework, operating system and/or firmware modules to handle voice input, including, for example, a streaming voice to text module 64 and a semantic processor module 66 including a parser module 68, dialog manager module 70 and action builder module 72.

Module 64 receives an audio recording of voice input, e.g., in the form of digital audio data, and converts the digital audio data into one or more text words or phrases (also referred to herein as "tokens"). In the illustrated implementation, module 64 is also a streaming module, such that voice input is converted to text on a token-by-token basis and in real time or near-real time, such that tokens may be output from module 64 effectively concurrently with a user's speech, and thus prior to a user enunciating a complete spoken declaration. Module 64 may rely on one or more locally-stored offline acoustic and/or language models 74, which together model a relationship between an audio signal and phonetic units in a language, along with word sequences in the language. In some implementations, a single model 74 may be used, while in other implementations, multiple models may be supported, e.g., to support multiple languages, multiple speakers, etc.

Whereas module 64 converts speech to text, module 66 attempts to discern the semantics or meaning of the text output by module 64 for the purpose or formulating an appropriate response. Parser module 68, for example, relies on one or more offline grammar models 76 to map text to particular actions and to identify attributes that constrain the performance of such actions, e.g., input variables to such actions. In some implementations, a single model 76 may be used, while in other implementations, multiple models may be supported, e.g., to support different actions or action domains (i.e., collections of related actions such as communication-related actions, search-related actions, audio/visual-related actions, calendar-related actions, device control-related actions, etc.)

As an example, an offline grammar model 76 may support an action such as "set a reminder" having a reminder type parameter that specifies what type of reminder to set, an item parameter that specifies one or more items associated with the reminder, and a time parameter that specifies a time to activate the reminder and remind the user. Parser module 64 may receive a sequence of tokens such as "remind me to," "pick up," "bread," and "after work" and map the sequence of tokens to the action of setting a reminder with the reminder type parameter set to "shopping reminder," the item parameter set to "bread" and the time parameter of "5:00 pm,", such that at 5:00 pm that day the user receives a reminder to "buy bread."

Parser module 68 may also work in conjunction with a dialog manager module 70 that manages a dialog with a user. A dialog, within this context, refers to a set of voice inputs and responses similar to a conversation between two individuals. Module 70 therefore maintains a "state" of a dialog to enable information obtained from a user in a prior voice input to be used when handling subsequent voice inputs. Thus, for example, if a user were to say "remind me to pick up bread," a response could be generated to say "ok, when would you like to be reminded?" so that a subsequent voice input of "after work" would be tied back to the original request to create the reminder. In some implementations, module 70 may be implemented as part of personal assistant module 56.

Action builder module 72 receives the parsed text from parser module 68, representing a voice input interpretation and generates one or more responsive actions or "tasks" along with any associated parameters for processing by module 62 of personal assistant module 56. Action builder module 72 may rely on one or more offline action models 78 that incorporate various rules for creating actions from parsed text. In some implementations, for example, actions may be defined as functions F such that $F(I_T)=A_U$, where T represents the type of the input interpretation and U represents the type of output action. F may therefore include a plurality of input pairs (T, U) that are mapped to one another, e.g., as $f(i_t)=a_u$, where $i_t$ is an input proto variable of type t, and $a_u$ is an output modular argument or parameter of type u. It will be appreciated that some parameters may be directly received as voice input, while some parameters may be determined in other manners, e.g., based upon a user's location, demographic information, or based upon other information particular to a user. For example, if a user were to say "remind me to pick up bread at the grocery store," a location parameter may not be determinable without additional information such as the user's current location, the user's known route between work and home, the user's regular grocery store, etc.

As noted above, in some implementations, personal assistant module 56 may receive commands from a user and use various offline and online resources to initiate one or more responsive actions. When a user provides voice input to the personal assistant module 56 to initiate a task, action builder module 72 may identify multiple candidate actions that may be potentially responsive to the user declaration. While a user could be provided with an opportunity (e.g., via a voice dialog) to select from the multiple candidate responsive actions, that might not be ideal if the user is already engaged in other activities, such as driving. Moreover, if there are several candidate responsive actions, presenting them all may distract the user with too much information and/or choice, which may cause the user to avoid interacting with the personal assistant module 56 in the future.

Accordingly, in some implementations, the personal assistant module 56 may initiate a nondeterministic task initiation process that non-deterministically selects, from a plurality of candidate responsive actions having corresponding probabilities of being responsive to a user declaration, a single responsive action to be exclusively initiated by voice-enabled device 52 in response to the user declaration. Consequently, when the user makes the declaration, an action is automatically initiated with little or no additional input from the user.

In various implementations, the probabilities corresponding to the multiple candidate responsive actions may be based at least in part on a history of interaction between a user and one or more computing devices of an ecosystem of devices operated by the user, such as voice-enabled device 52. In various implementations, a probability associated with the selected responsive action may be subsequently altered based on one or more interactions between the user and voice-enabled device 52 (or other devices of the ecosystem) following initiation of the selected task.

It will be appreciated that in some implementations, models 74, 76 and 78 may be combined into fewer models or split into additional models, as may be functionality of modules 64, 68, 70 and 72. Moreover, models 74-78 are referred to herein as offline models insofar as the models are stored locally on voice-enabled device 52 and are thus accessible offline, when device 52 is not in communication with online semantic processor 54. Moreover, while module 56 is described herein as being a personal assistant module, that is not meant to be limiting. In various implementations, any type of app operating on voice-enabled device 52 may perform techniques described herein to non-deterministically select and/or invoke responsive actions in response to user declarations and queries.

In various implementations, online semantic processor 54 may include complementary functionality for handling voice input, e.g., using a voice-based query processor 80 that relies on various acoustic/language, grammar and/or action models 82. It will be appreciated that in some implementations, particularly when voice-enabled device 52 is a resource-constrained device, voice-based query processor 80 and models 82 used thereby may implement more complex and computational resource-intensive voice processing functionality than is local to voice-enabled device 52.

In some implementations, multiple voice-based query processors 80 may be employed, each acting as an online counterpart for one or more individual personal assistant modules 56. For example, in some implementations, each device in a user's ecosystem may be configured to operate an instance of a personal assistant module 56 that is associated with the user (e.g., configured with the user's preferences, associated with the same interaction history, etc.). A single, user-centric online instance of voice-based query processor 80 may be accessible to each of these multiple instances of personal assistant module 56, depending on which device the user is operating at the time.

In some implementations, both online and offline functionality may be supported, e.g., such that online functionality is used whenever a device is in communication with an online service, while offline functionality is used when no connectivity exists. In other implementations different actions or action domains may be allocated to online and offline functionality, and while in still other implementations, online functionality may be used only when offline functionality fails to adequately handle a particular voice input. In other implementations, however, no complementary online functionality may be used.

Figure 3:
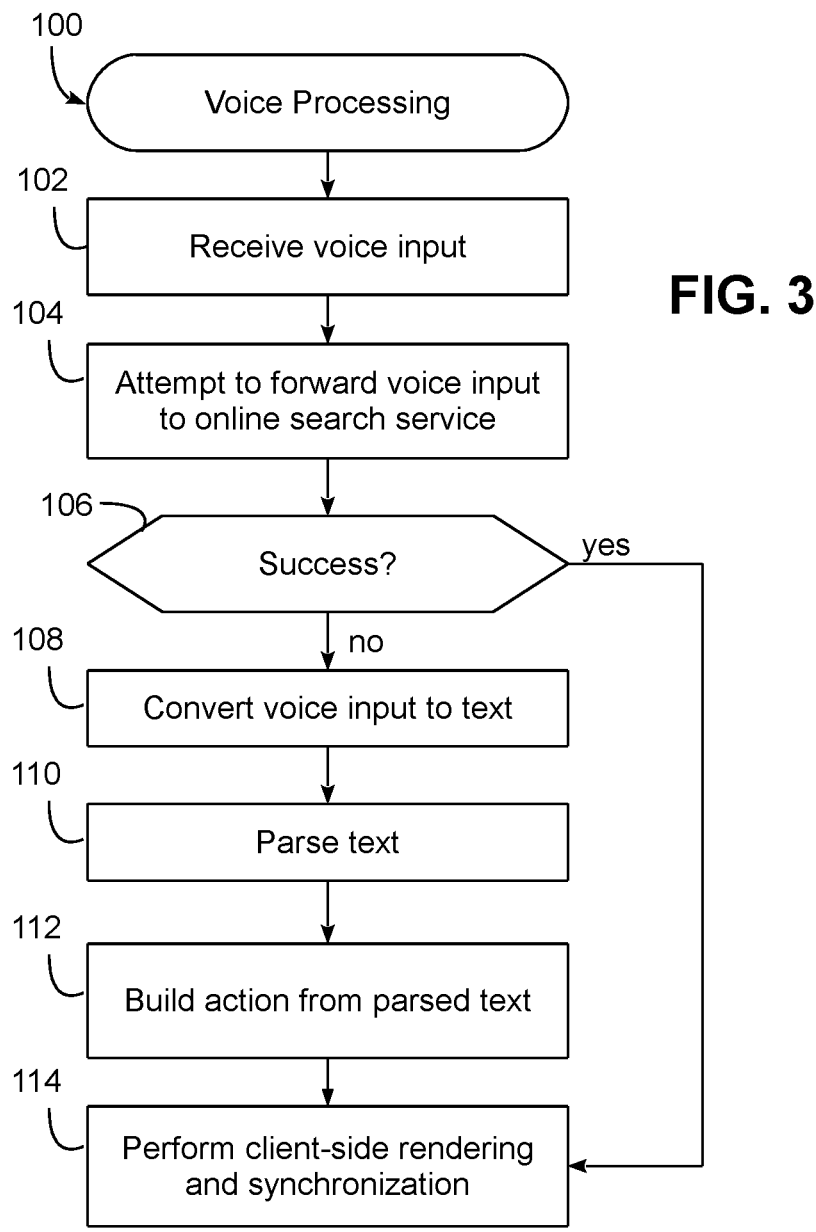
FIG. 3 is a flowchart illustrating an example method of processing a voice input using the environment of FIG. 2.

FIG. 3, for example, illustrates a voice processing routine 100 that may be executed by voice-enabled device 52 to handle a voice input. Routine 100 begins in block 102 by receiving voice input, e.g., in the form of a digital audio signal. In this implementation, an initial attempt is made to forward the voice input to the online search service (block 104). If unsuccessful, e.g., due to a lack of connectivity or a lack of a response from the online search service, block 106 passes control to block 108 to convert the voice input to text tokens (block 108, e.g., using module 64 of FIG. 2), parse the text tokens (block 110, e.g., using module 68 of FIG. 2), and build an action from the parsed text (block 112, e.g., using module 72 of FIG. 2). The resulting action is then used to perform client-side rendering and synchronization (block 114, e.g., using module 62 of FIG. 2), and processing of the voice input is complete.

Returning to block 106, if the attempt to forward the voice input to the online search service is successful, block 106 bypasses blocks 108-112 and passes control directly to block 114 to perform client-side rendering and synchronization. Processing of the voice input is then complete. It will be appreciated that in other implementations, as noted above, offline processing may be attempted prior to online processing, e.g., to avoid unnecessary data communications when a voice input can be handled locally.

Figure 4:
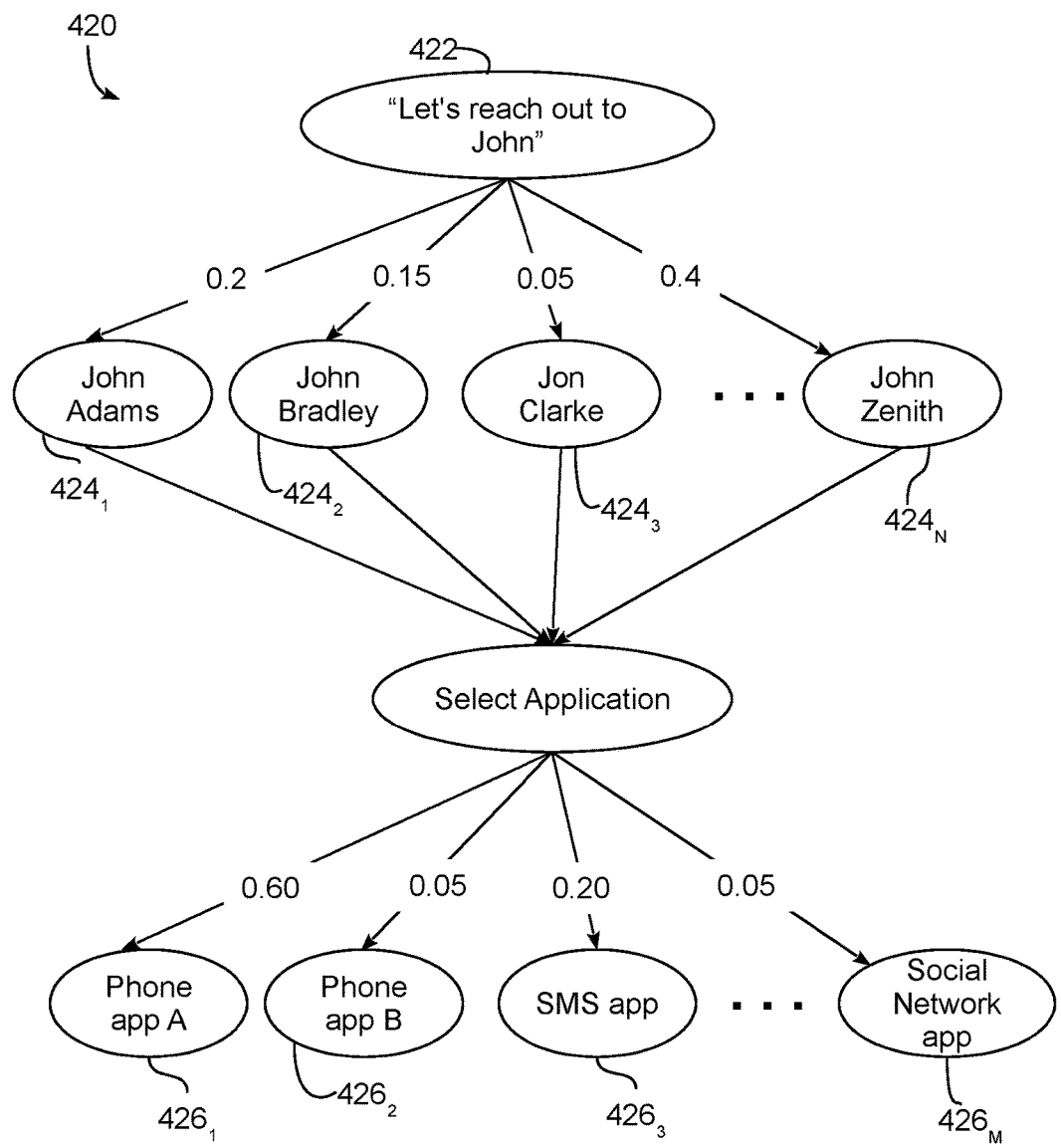
FIG. 4 illustrates an example of how multiple aspects a personal assistant module's response to a user declaration may be non-deterministically selected.

FIG. 4 schematically demonstrates an example scenario 420 of how personal assistant module 56, alone or in conjunction with a counterpart online voice-based processor 80, may invoke a nondeterministic task initiation process to non-deterministically select/initiate one or more responsive actions to perform in response to a user declaration 422. In this example, the user declaration 422 includes voice input in the form of the spoken phrase, "Let's reach out to John." In response to the user declaration 422, a plurality of candidate responsive actions, $424_{1-N}$ and $426_{1-M}$, may be identified, e.g., by action builder module 72 and/or personal assistant module 56. Each candidate responsive action 424/426 has an associated probability of satisfying the user declaration 422.

Assuming the user that issued user declaration 422 has multiple contacts named "John" or "Jon," user declaration 422 is ambiguous as to which "John" the user is referring to. Accordingly, a first "level" of candidate responsive actions 424 includes contacts having the name "John" or "Jon" in the user's contact list (or social network, or other source). The first contact $424_1$, John Adams, has a 20% probability of being responsive to user declaration 422. The second contact $424_2$, John Bradley, has a 15% probability of being responsive to user declaration 422. The third contact $424_3$, Jon Clarke, has a 5% probability of being responsive to user declaration 422. Contact $424_N$, John Zenith, has a 40% probability of being responsive to user declaration 422. In various implementations, one or more undepicted contacts may have probabilities that, when included with those shown in FIG. 4, add up to 100%, although this is not required.

Using techniques described herein, personal assistant module 56 may non-deterministically and exclusively select a single contact 424 in response to user declaration 422 based at least on these probabilities. Accordingly, there is a 20% chance John Adams will be selected, a 40% chance John Zenith will be selected, and so on. Consequently, if the user provides the same user declaration 422 ten times, chances are that John Adams will be selected twice, John Zenith will be selected four times, and the remaining four instances will be distributed among the remaining contacts 424. In other implementations, candidates having probabilities that fail to satisfy one or more thresholds may be discarded, and a responsive candidate may be non-deterministically (e.g., completely randomly or random based on probabilities) selected from the remaining candidates.

In the example of FIG. 4, the user declaration 422 of "Let's reach out to John" is also ambiguous as to how John is to be contacted. Voice-enabled device 52 likely has a variety of apps $426_{1-M}$ installed that may be potentially responsive to user declaration 422. Accordingly, a second "level" of candidate responsive actions includes candidate apps 426 that are installed on voice-enabled device 52 and that if initiated may be potentially responsive to user declaration 422. In FIG. 4, the contact is selected first, and then the app. However, this is not meant to be limiting, and the app may be selected before the contact in other implementations and/or scenarios. Moreover, selection of one of a particular app and contact may impact a probability associated with downstream selection of the other of the particular app and contact.

In this example, the first candidate app $426_1$ is "Phone app A," which may be a standard cellular phone application typically found on smart phones. It has an associated probability of 60%. The second candidate app $426_2$ is "Phone app B," which may be a so-called "internet phone" application that uses voice-over-IP ("VoIP") or other similar technology to facilitate telephone conversations. It has an associated probability of 5%, which suggests that the user rarely uses Phone app B $426_2$ as a mode of communication. The third candidate app $426_3$ is a short messaging service ("SMS") app. It has an associated probability of 20%. Another candidate app $426_M$ is a social networking application, which the user could use to send a social network message. It has an associated probability of 5%, which again suggests the user rarely uses it to as a mode of communication.

As was the case with the candidate contacts 424, personal assistant module 56 may non-deterministically select a single app 426 for exclusive initiation in response to user declaration 422 based at least in part on these probabilities. Thus, there is a 60% chance Phone app A will be automatically initiated and a 20% chance that SMS app 4263 will be automatically initiated. The remaining apps 426 have relatively low probabilities, and therefore are far less likely to be automatically initiated (and in some implementations may be eliminated from consideration altogether). Consequently, if the user provides the same user declaration 422 ten times, chances are that Phone app A $426_1$ will be selected six times, SMS app $426_3$ will be selected twice, and the remaining two instances will be distributed among the remaining apps 426. Of course, as noted above, the probabilities associated with candidate responsive apps $426_{1-M}$ may be affected by which contact 424 is non-deterministically selected. For instance, if John Bradley is non-deterministically selected and the user usually corresponds with John Bradley via SMS app $426_3$, then the probability associated with SMS app $426_3$ may be increased.

Probabilities associated with candidate responsive actions (e.g., 424, 426) may be determined based on a variety of information signals. In some implementations, they may be based at least in part on a history of interaction between a user and one or more computing devices operated by the user, such as the "ecosystem" of devices mentioned previously. A history of interaction between a user and one or more computing devices may include various records of user interactions which may be stored together or separately. For example, a history of interaction of a user may include a call log (or more than one call log if there are multiple alternative calling applications), a text message history, an email history (e.g., an inbox and sent mail), and other records of user interaction with various apps installed on one or more of an ecosystem of devices operated by the user.

As an example and referring once again to FIG. 4, it may be determined, e.g., from call logs, text message history, email history, etc., that when the user who issued user declaration 422 initiates communication with anyone in a contact list having a name of "John" or "Jon," John Zenith has historically been the most popular "John/Jon" targeted by the user (as reflected by the 40% probability), followed by John Adams, then John Bradley, then Jon Clarke, and so on. For example, in the last N times the user has contacted a "John/Jon," John Zenith may have been the target 40% of the time, John Adams 20% of the time, and so forth. Similarly, it may be determined, from the same or different sources, that when the user initiates communication with anyone, he or she does so most often using Phone app A (e.g., 60% of the last N instances of initiating contact with another user), then SMS app, and so on.

In some implementations, a probability associated with one responsive action may be determined based at least in part on one or more information signals associated with another task that is deemed sufficiently similar. For example, in calculating the probabilities associated with the candidate contacts $424_{1-N}$ of FIG. 4, any form of prior contact with a particular contact, such as a prior phone call using Phone app A, a prior text sent using the SMS app, and so forth, may be considered collectively when determining a probability associated with initiating contact with that particular contact using another app. Suppose a user issues the declaration "message Bob," but there are no prior messaging activities detected in the user's messaging history, particularly in response to a declaration to a personal assistant module of "message Bob." However, there are records of the user placing outgoing calls to a contacted named "Bob Smith" in response to prior user declarations to the personal assistant module of "call Bob." The messaging and calling responsive actions may be deemed sufficiently similar that in response to the "message Bob" declaration, the personal assistant module may calculate a probability that the declaration should be fulfilled by messaging Bob Smith.

In addition to or instead of raw popularity, in various implementations, a probability associated with a candidate responsive action may be determined based at least in part on how recently the responsive action (or a sufficiently similar responsive action) is detected in the user's interaction history. Suppose a user has historically picked "John Zenith" more often after issuing a declaration, "call John," than "John Adams." However, suppose the user has selected "John Adams" more often than "John Zenith" in recent instances (e.g., over the last week). In some implementations, this may be taken into account to compute a probability associated with "John Adams" as being slightly greater than it might be otherwise.

Probabilities associated with candidate responsive actions (e.g., 424, 426) may also change over time in response to a variety of signals. In some implementations, a probability associated with a non-deterministically-selected responsive action may be altered based on one or more interactions between the user and one or more voice-enabled devices 52 of an ecosystem following initiation of the selected task. Suppose John Adams ($424_1$) is non-deterministically selected, and Phone app A ($426_1$) is non-deterministically initiated with John Adams' phone number pre-dialed. Suppose further that the user presses "talk" to initiate the call. That user interaction may be interpreted as positive feedback which may consequently cause future probabilities assigned to John Adams and Phone App A to be increased. Likewise, if the user rejects instantiation of Phone App A with John Adams' number pre-dialed and instead manually dials a new number, that interaction may be interpreted as negative feedback which causes the same probabilities to decrease.

In various implementations, an amount by which a probability associated with a candidate responsive action may be altered in response to positive or negative feedback may be determined based on various measures. In some implementations, a probability associated with a non-deterministically-selected responsive action may be altered by an amount that is inversely proportional to a measure of similarity between the non-deterministically-selected responsive action and an alternative responsive action that was, for instance, manually initiated by the user after rejecting the non-deterministically-selected task. Suppose a user issues a request to "set a reminder to take out the trash tomorrow morning," and the responsive action that is non-deterministically selected is for an entry to be created in the user's work calendar. Suppose further that the user rejects this responsive action and instead manually defines an entry in her personal calendar to take out the trash tomorrow morning. Because these two task—creating a reminder in a work calendar versus creating a reminder in a personal calendar—are somewhat similar, the fact that the user rejected the former in favor of the latter may only impact probabilities associated with each task by a relatively small amount. By contrast, had the user rejected the former in favor of manually setting a task in a completely distinct, non-calendar-related task reminder application (e.g., associated with the operating system), the probabilities may have been impacted more dramatically.

"Similarity" between two candidate responsive actions may be determined using a variety of techniques. In some implementations, various features may be extracted from each candidate responsive action to form a feature vector. Candidate responsive action feature vectors may then be compared to each other using various algorithms such as Kullback-Leibler ("KL") divergence, cosine similarity (sometimes referred to as "soft cosine measure"), Levenshtein distances, and so forth, to determine a measure of similarity between them.

In some implementations, probabilities associated with candidate responsive actions may additionally or alternatively be determined based on information signals associated with a user's current and/or past context. In various implementations, a user's current context may include the user's current location (e.g., position coordinates provided by a GPS sensor on voice-enabled device 52), a current time at the location of the user, a currently scheduled entry on the user's calendar, a user's social networking status, and/or other signals that may be determined from various sensors. For example, voice-enabled device 52 may be equipped with accelerometer that reveals that the user is in a moving automobile or in an airplane. Additionally or alternatively, a user's context may include one or more apps that are currently installed and/or running/not running on voice-enabled device 52.

Suppose a user issues the voice command represented by user declaration 422 in FIG. 4 to voice-enabled device 52. Suppose further that SMS app 426₃ is already open in the background, and that the user had been recently texting with John Bradley. The fact that SMS app 426₃ is already open may cause the probability of that app being responsive to user declaration 422 to increase (e.g., from the 20% depicted in FIG. 4 to a higher probability). Similarly, the fact that the user had recently been texting with John Bradley may also increase the probability associated with the candidate contact 424₂ of John Bradley (e.g., from the 15% depicted in FIG. 4 to a correspondingly higher probability). Consequently, it may be more likely that the SMS app 426₃ will be non-deterministically selected to draft a text message to John Bradley (also non-deterministically selected) than would have been the case based on the probabilities depicted in FIG. 4.

As another example, suppose that when a user issues a request to "call David," the user usually means David Smith, who lives in the same time zone. However, suppose the user has travelled to a faraway time zone, and that the user has another contact named David Jones that lives in that faraway time zone. Normally, the probability of non-deterministically initiating a call to David Smith may be higher than the probability of non-deterministically initiating a call to David Jones. However, based on the user's current context, which may be determined based on one or more signals from voice-enabled device 52 such as the user's current location and/or time, the probability of non-deterministically initiating a call to David Jones may be increased. Consequently, while the user is travelling in David Jones' time zone, a user request to "call David" may be more likely to cause a call to be non-deterministically initiated to David Jones than to David Smith. Vice versa, when the user is at home, a user request to "call David" may be more likely to cause a call to be non-deterministically initiated to David Smith than to David Jones.

In addition to corresponding time zones, other information signals associated with contacts may be used to determine probabilities that those contacts are who a user refers to in an ambiguous declaration issued to a personal assistant module. For example, suppose a user with two contacts named "Sven" issues a request to "call Sven." One Sven contact may normally be favored (i.e. assigned a higher probability) but if the user has a meeting scheduled with the other Sven in the near future, the other Sven's probability may be at least temporarily elevated leading up to, during, and perhaps for some time after the meeting. Similarly, if one Sven has an upcoming birthday, or is scheduled to arrive in town on a particular flight, that Sven's probability may be elevated over the other Sven, at least temporarily.

In some implementations, a probability associated with at least one responsive action may be based on a measure of similarity between the user's current context and a context of the user when the user initiated the at least one responsive action (or a sufficiently similar task) in the past. Suppose the user typically calls co-worker David Smith during the week and sibling David Jones on the weekends. If the user issues the declaration "call Dave" during the week, the user's context may be more similar to previous instances in which the user called David Smith, thereby increasing the probability that a call with David Smith will be initiated non-deterministically. Likewise, if the user issues the declaration during the weekend, the user's context may be more similar to previous instances in which the user called David Jones. This may increase the probability that a call with David Jones will be initiated non-deterministically.

More complex contextual comparisons may be performed as well to determine probabilities. In some implementations, features may be extracted from previous and current contexts and compared to determine measures of similarity. Similar to above with the alternative candidate responsive actions, various techniques may be employed to calculate measures of similarity between contexts, including but not limited to KL divergence, cosine similarity, Levenshtein distances, etc. For example, upon issuing a declaration, a feature vector corresponding to the user's current context may be compared to feature vectors generated for the user's context during prior performance of each of a plurality of candidate responsive actions. The candidate responsive action with a feature vector that is most similar to the feature vector representing the user's current context may be deemed to have the highest chance of being responsive, and may therefore be assigned the highest probability. The candidate responsive action with a feature vector that is least similar to the feature vector representing the user's current context may be deemed to have the lowest chance of being responsive, and may therefore be assigned the lowest probability. And so on.

Figure 5:
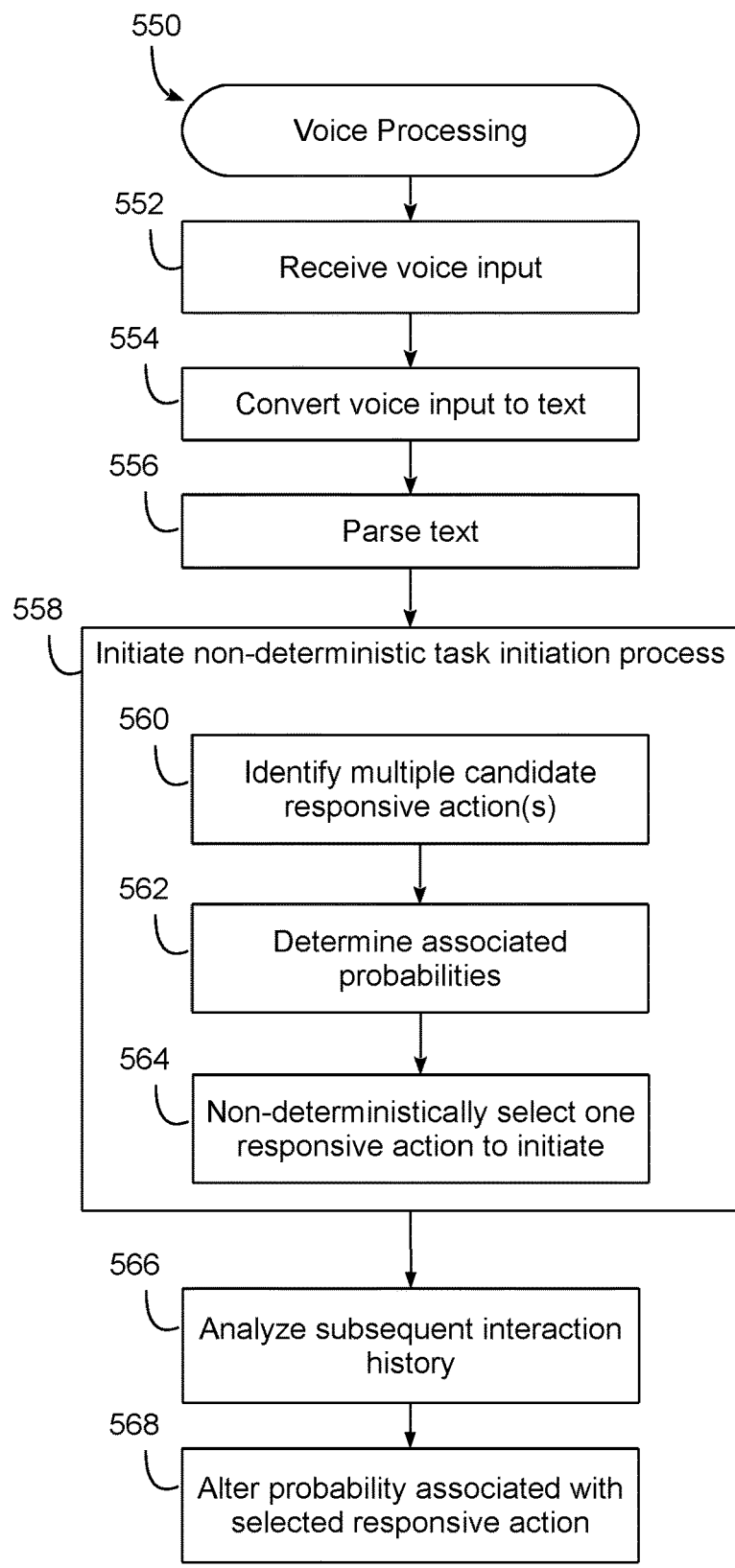
FIG. 5 is a flowchart illustrating an example method of nondeterministic task initiation by a personal assistant module.

FIG. 5 illustrates a routine 550 suitable for execution by a personal assistant module to non-deterministically select and/or initiate one or more tasks that are potentially responsive to a user declaration. Routine 550 may be executed by the same service that processes voice-based queries, or may be a different service altogether.

Blocks 552-556 of routine 550 are similar to various blocks of routine 100 depicted in FIG. 3. At block 552, voice input is received, e.g., in the form of a digital audio signal. At block 554, the voice input is converted to text tokens (e.g., using module 64 and/or model 82 of FIG. 2). At block 556, the text tokens may be parsed (e.g., using module 68 and/or model 82 of FIG. 2).

At block 558, a nondeterministic task initiation process (e.g., a subroutine) may be initiated, e.g., by personal assistant module 56, to non-deterministically select and/or initiate an action that is responsive to the declaration identified at block 556. At block 560, the nondeterministic task initiation process may identify (or may request action builder module 72 to identify), as candidates, multiple actions that may potentially be responsive to the user declaration identified at block 556. For example, if the user declaration includes the term "call," then any application that is semantically related to the action of calling, such as one or more phone applications, may be identified as potentially responsive candidates.

At optional block 562, one or more probabilities associated with the one or more candidate responsive actions identified at block 560 may be determined. As noted above, these probabilities may be based on a variety of information signals, such as user interaction history, a user's current context, a user's context at the time the user previously initiated the candidate responsive actions, and so forth. At block 564, a single responsive action may be non-deterministically selected and/or initiated on voice-enabled device 52, in some cases based at least in part on the probabilities determined at block 562.

At block 566, subsequent interaction history between the user and voice-enabled device 52 (and/or other computing devices forming part of the user's ecosystem) may be analyzed. At block 568, one or more probabilities associated with one or more candidate responsive actions may be correspondingly altered in response, e.g., in response to a subsequent user declaration. As noted previously, the subsequent interaction history may include, for instance, the user accepting or rejecting a non-deterministically initiated responsive action.

Interaction history between a user and an ecosystem of computing devices operated by that user may be saved in various memory locations in addition to or instead of memory of those computing devices. For example, in some implementations, one or more interaction history records may be stored on the cloud, e.g., in association with one or more voice-based query processors 80. In this sense, when a user declaration is provided at one computing device, one or more other computing devices of the ecosystem and/or records stored on the cloud may be consulted and used to assign probabilities to candidate responsive actions. The user's subsequent interaction history may also be stored in one or more of these various locations for future use. By storing at least some interaction history records on the cloud, those records may be available across all computing devices of a user's ecosystem. This may lead to a more consistent experience by the user across all of her devices. In addition, when the user adds a new device to her ecosystem, a personal assistant module operating on that new device may immediately have access to interaction history of the user.

While implementations described herein have primarily demonstrated the use of telephone and messaging responsive actions, this is not meant to be limiting. Techniques described herein may be used to assign probabilities to a variety of other types of responsive actions. For example, when a user says "set an alarm for me at XX," the user's previous interactions with computing devices of her ecosystem may be analyzed to determine her habits vis-à-vis alarm setting. Based on those habits and various other information signals such as the date, time and location, an alarm time may be non-deterministically selected for the user to accept or reject.

In some implementations, if probabilities associated with all possible candidate responsive actions fail to satisfy some threshold (e.g., >%15), that suggests little confidence that any particular responsive action will be correct. In such instances, personal assistant module 56 may solicit additional information from the user. In some implementations, one or more prompts provided to the user in such a situation may be selected using techniques described herein. For example, the user may be prompted specifically for information to disambiguate between two or more candidate responsive actions with the highest associated probabilities. And as noted above, in other implementations, only candidate responsive actions having probabilities that satisfy one or more thresholds (or only the N highest probability candidates) may be included in the pool of candidates from which one is non-deterministically selected.

In addition, in some implementations, a probability associated with a non-deterministically selected responsive action may affect how the responsive action is initiated and/or presented to a user. For example, if the probability satisfies some relatively high threshold (e.g., >95%), then the responsive action may be fully initiated (e.g., a call may be placed). If the probability does not satisfy that threshold, the responsive action may be initiated to a lesser degree (e.g., the phone app may be opened and the number pre-dialed, but the call may not be placed until the user presses "talk").

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
identifying, by one or more processors, a user declaration received at a given computing device, wherein the user declaration includes a command to communicate with an individual, and the command is ambiguous with regard to an identity of the individual and an application to be used to communicate with the individual;
identifying, by one or more of the processors, based on the user declaration, a plurality of candidate contacts that are potentially responsive to the command;
determining, by one or more of the processors, based on a history of interaction between the user and one or more computing devices operated by the user, a probability that each candidate contact will be responsive to the command;
non-deterministically selecting, by one or more of the processors and based at least in part on the probabilities of the plurality of candidate contacts, a single candidate contact of the plurality of candidate contacts to be a target of communication initiated in response to the user declaration;
identifying, by one or more of the processors, based on the user declaration, a plurality of candidate applications that can be initiated by the given computing device in response to the user declaration to communicate with the single candidate contact;
determining, by one or more of the processors, based on a history of communication between the user and the single candidate contact using one or more of the computing devices operated by the user, a probability that initiation of each candidate application will be responsive to the user declaration;
non-deterministically selecting, by one or more of the processors and based at least in part on the probabilities of the plurality of candidate applications, a single candidate application of the plurality of candidate applications to be exclusively initiated on the given computing device in response to the user declaration;
exclusively initiating, by one or more of the processors, the single candidate application on the given computing device to communicate with the single candidate contact; and
altering, by one or more of the processors, the probability associated with the single candidate contact or the probability associated with the initiated application based on one or more interactions between the user and the given computing device following initiation of the initiated application;
wherein the one or more interactions between the user and the given computing device include rejection of the single candidate contact and manual selection of an alternative candidate contact; and
wherein the altering comprises altering the probability associated with the single candidate contact by an amount that inversely proportionate to a measure of similarity between the single candidate contact and the alternative candidate contact.

2. The computer-implemented method of claim 1, wherein the probabilities of the plurality of contacts or the probabilities of the plurality of candidate applications are determined further based at least in part on a current context of the user.

3. The computer-implemented method of claim 2, wherein the current context of the user includes a current location of the user determined by the given computing device.

4. The computer-implemented method of claim 2, wherein the current context of the user includes a current time at a current location of the user.

5. The computer-implemented method of claim 2, wherein a probability associated with at least one candidate application is based on a measure of similarity between the user's current context and a context of the user when the user initiated the at least one candidate application in the past.

6. The computer-implemented method of claim 1, wherein the plurality of candidate applications include a plurality of software applications that are installed and available on the given computing device.

7. The computer-implemented method of claim 1, wherein the user declaration comprises a request to initiate a telephone call, and the plurality of candidate applications include a plurality of telephone applications that are installed and available on the given computing device.

8. The computer-implemented method of claim 1, wherein the user declaration comprises a request to send a message, and the plurality of candidate applications include a plurality of messaging applications that are installed and available on the given computing device.

9. The computer-implemented method of claim 1, wherein the user declaration comprises a request to set a reminder, and the plurality of candidate applications include a plurality of applications that are installed and available on the given computing device that include reminder functionality.

10. A system comprising one or more processors and memory storing instructions that cause the one or more processors to:
identify a user declaration received at a given computing device, wherein the user declaration includes a command to communicate with an individual, and the command is ambiguous with regard to an identity of the individual and an application to be used to communicate with the individual;
identify, based on the user declaration, a plurality of candidate contacts that are potentially responsive to the command;
determine, based on a history of interaction between the user and one or more computing devices operated by the user, a probability that each candidate contact will be responsive to the command;
non-deterministically select, based at least in part on the probabilities of the plurality of candidate contacts, a single candidate contact of the plurality of candidate contacts to be a target of communication initiated in response to the user declaration;
identify, based on the user declaration, a plurality of candidate applications that can be initiated by the given computing device to in response to the user declaration to communicate with the single candidate contact;
determine, based on a history of communication between the user and the single candidate contact using one or more of the computing devices operated by the user, a probability that initiation of each candidate application will be responsive to the user declaration;
non-deterministically select, based at least in part on the probabilities of the plurality of candidate applications, a single candidate application of the plurality of candidate applications to be exclusively initiated on the given computing device in response to the user declaration;

exclusively initiate the single candidate application on the given computing device to communicate with the single candidate contact; and alter the probability associated with the single candidate contact or the probability associated with the initiated application based on one or more interactions between the user and the given computing device following initiation of the initiated application;

wherein the one or more interactions between the user and the given computing device include rejection of the single candidate contact and manual selection of an alternative candidate contact; and wherein the altering comprises altering the probability associated with the single candidate contact by an amount that is inversely proportionate to a measure of similarity between the single candidate contact and the alternative candidate contact.

11. The system of claim 10, wherein the probabilities of the plurality of contacts or the probabilities of the plurality of candidate applications are determined further based at least in part on a current context of the user.

12. The system of claim 11, wherein the current context of the user includes a current location of the user determined by the given computing device.

13. The system of claim 11, wherein the current context of the user includes a current time at a current location of the user.

14. The system of claim 11, wherein a probability associated with at least one candidate application is based on a measure of similarity between the user's current context and a context of the user when the user initiated the at least one candidate application in the past.

15. The system of claim 10, wherein the plurality of candidate applications include a plurality of software applications that are installed and available on the given computing device.

16. At least one non-transitory computer-readable medium comprising instructions that, in response to execution of the instructions by a computing system, cause the computing system to perform the following operations:

identifying a user declaration received at a given computing device, wherein the user declaration includes a command to communicate with an individual, and the command is ambiguous with regard to an identity of the individual and an application to be used to communicate with the individual;

identifying, based on the user declaration, a plurality of candidate contacts that are potentially responsive to the command;

determining, based on a history of interaction between the user and one or more computing devices operated by the user, a probability that each candidate contact will be responsive to the command;

non-deterministically selecting, based at least in part on the probabilities of the plurality of candidate contacts, a single candidate contact of the plurality of candidate contacts to be a target of communication initiated in response to the user declaration;

identifying, based on the user declaration, a plurality of candidate applications that can be initiated by the given computing device in response to the user declaration;

determining, based on a history of communication between the user and the single candidate contact using one or more computing devices operated by the user, a probability that initiation of each candidate application will be responsive to the user declaration;

non-deterministically selecting, based at least in part on the probabilities of the plurality of candidate applications, a single candidate application of the plurality of candidate applications to be exclusively initiated on the given computing device in response to the user declaration;

exclusively initiating the single candidate application on the given computing device to communicate with the single candidate contact; and altering the probability associated with the single candidate contact or the probability associated with the initiated application based on one or more interactions between the user and the given computing device following initiation of the initiated application;

wherein the one or more interactions between the user and the given computing device include rejection of the single candidate contact and manual selection of an alternative candidate contact; and wherein the altering comprises altering the probability associated with the single candidate contact by an amount that is inversely proportionate to a measure of similarity between the single candidate contact and the alternative candidate contact.

17. The at least one non-transitory computer-readable medium of claim 16, wherein the probabilities of the plurality of contacts or the probabilities of the plurality of candidate applications are determined further based at least in part on a current context of the user.

18. The at least one non-transitory computer-readable medium of claim 17, wherein the current context of the user includes a current location of the user determined by the given computing device.

19. The at least one non-transitory computer-readable medium of claim 17, wherein the current context of the user includes a current time at a current location of the user.

20. The at least one non-transitory computer-readable medium of claim 17, wherein a probability associated with at least one candidate application is based on a measure of similarity between the user's current context and a context of the user when the user initiated the at least one candidate application in the past.

* * * * *